United States Patent
Ratcliff

[15] 3,650,556
[45] Mar. 21, 1972

[54] FOLDING SCREEN FOR TELESCOPIC TRAILER

[72] Inventor: John W. Ratcliff, Marengo, Ill.
[73] Assignee: Ratcliff Industries, Inc., Marengo, Ill.
[22] Filed: Aug. 28, 1970
[21] Appl. No.: 67,748

[52] U.S. Cl. ...........................................296/23 C, 52/71
[51] Int. Cl. .........................................................B60p 3/32
[58] Field of Search ..................296/23 C, 23, 26; 52/69, 70, 52/71

[56] References Cited

UNITED STATES PATENTS 2,990,214  6/1961  Watson................................296/23
2,862,253  12/1958  Place.....................................52/66

*Primary Examiner*—Philip Goodman
*Attorney*—Andrus, Sceales, Starke & Sawall

[57] ABSTRACT

This invention relates to a collapsible trailer partition for use in a telescopic travel trailer in which an upper trailer section is disposed to telescope vertically with respect to a lower trailer section from a retracted lower position to an extended upper position. The upper trailer section is lowered to the retracted position for transporting and raised to the extended position for camping. A collapsible partition formed of multiple hinged panels is attached to the upper trailer section. A magnetic latch connects the lower portion of the collapsible partition to the lower trailer section to releasably secure the partition to the lower trailer section when the trailer is in extended upper position. The magnetic latch disengages to allow the partition to collapse in an accordion manner when the upper trailer section is lowered to the retracted position.

7 Claims, 5 Drawing Figures

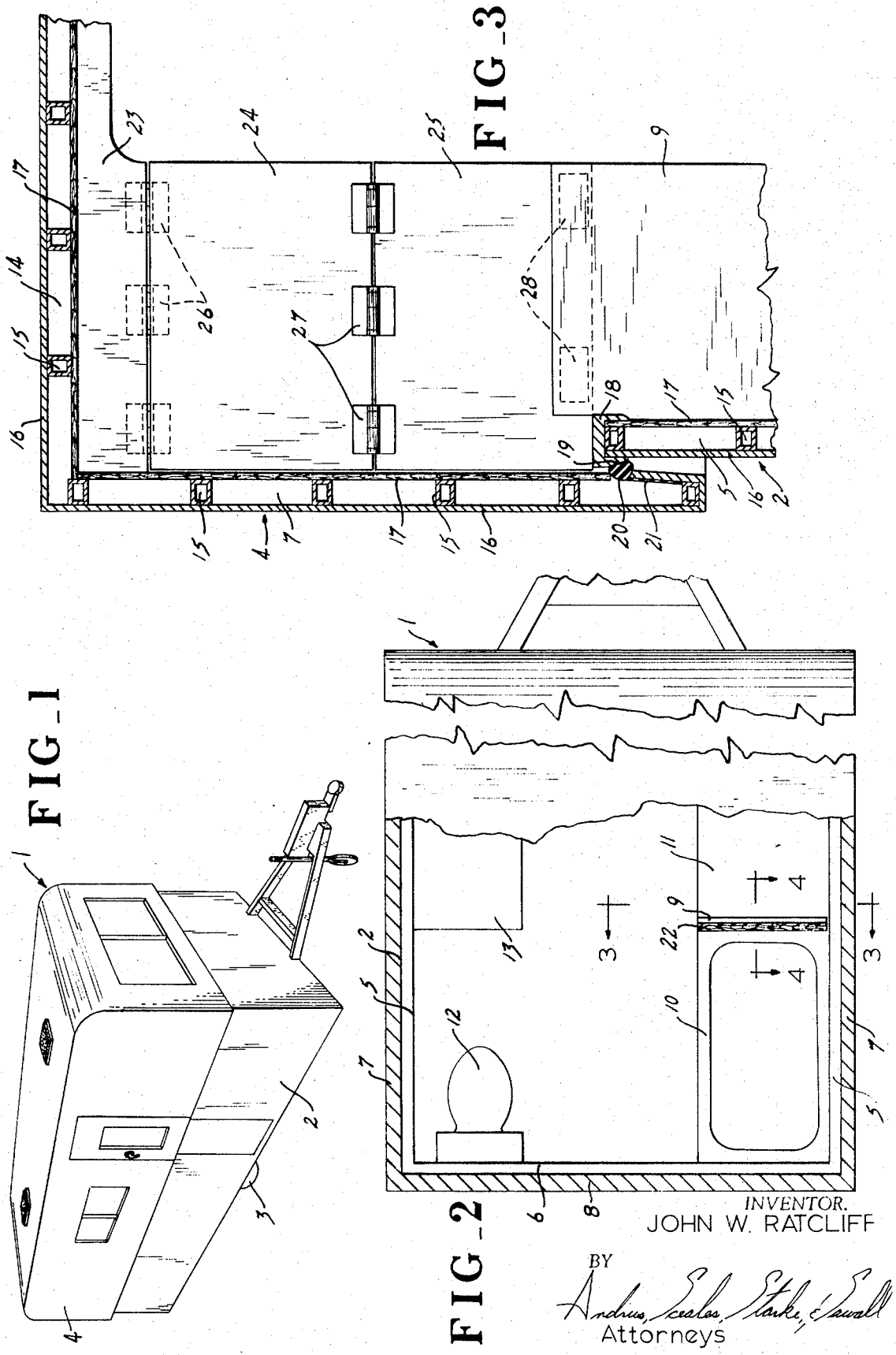

Patented March 21, 1972
3,650,556
FIG_4
FIG_5
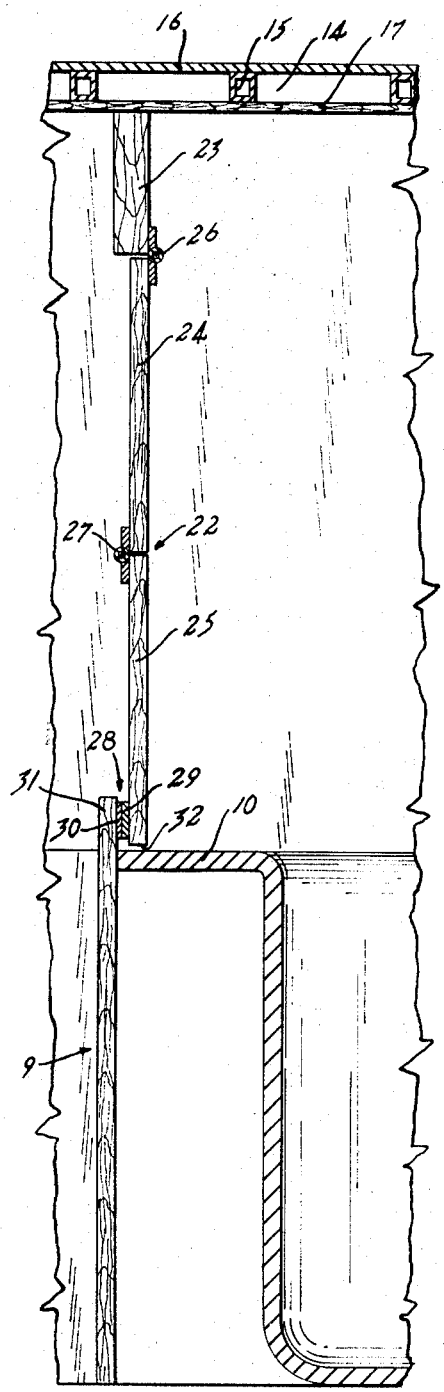
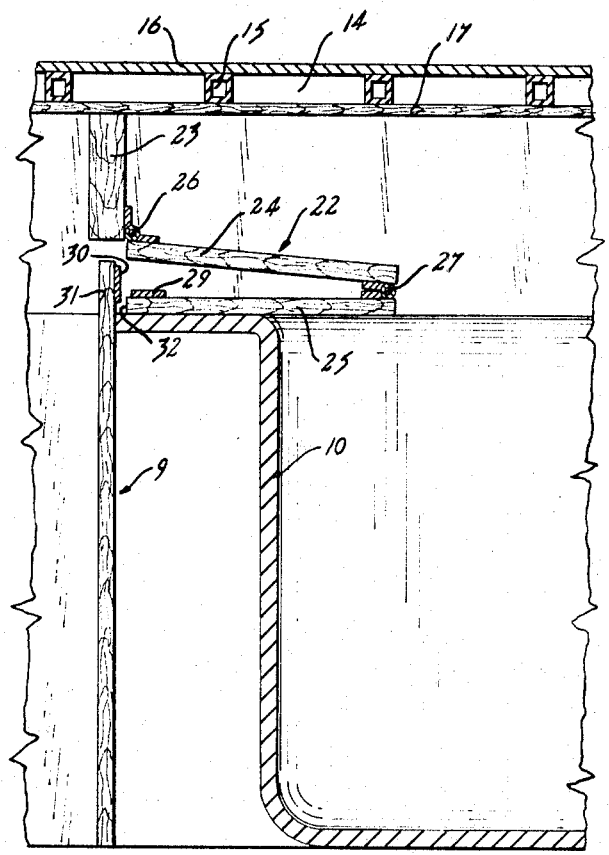
INVENTOR.
JOHN W. RATCLIFF
Attorneys

FOLDING SCREEN FOR TELESCOPIC TRAILER

BACKGROUND OF THE INVENTION

This invention relates to a collapsible partition used in a telescopic travel trailer.

A telescopic travel trailer comprises a lower trailer section and an upper trailer section which telescopes vertically with respect to the lower section. The upper trailer section is adapted to be lowered to a retracted position for transporting and raised to an extended position for camping.

The telescopic nature of upper and lower sections of the travel trailer has caused difficulty in constructing walls or room separations for secluded areas, such as for toilets or shower stalls. Specifically, solid, non-collapsible walls extending from the floor to the ceiling may not be employed because of their inability to telescope in accordance with telescopic movement of the upper and lower trailer sections.

Telescoping panels with an upper panel designed to telescope into a lower receptacle located in the lower trailer section are generally impractical since they require added space in the lower trailer section. In addition, telescoping partitions may not extend laterally beyond the vertical side of the lower trailer section or otherwise the partition will interfere with the telescoping action of the trailer sections, and thus a telescopic partition is not entirely satisfactory for it does not provide continuous and complete seclusion.

Folding or collapsible partitions that extend from the upper trailer section and are fixedly latched to the lower trailer section, such as by hinges, require an undesirable exacting alignment between the upper and lower sections to prevent fracture of the partition or the latch when closing.

Draw curtains have been employed to provide seclusion and room separation but lack permanency and frequently do not provide privacy.

SUMMARY OF THE INVENTION

This invention relates to a collapsible partition employed in a telescopic travel trailer. According to the invention, a plurality of vertically spaced panels or screens are connected by hinges to form a collapsible partition. The uppermost panel is hinged to the upper trailer section and as the upper trailer section is lowered to the transporting position the plurality of panels collapse upon each other in an accordion manner.

A magnetic latch assembly is employed to releasably connect the lowermost panel of the collapsible partition to the lower trailer section when the trailer sections are in the extended position. The latch assembly contains a magnet member and a magnetic susceptible member, the members capable of mutual magnetic attraction. One member may be attached to the collapsible partition and the other attached to the lower trailer section for mutual alignment when the upper trailer section is in the raised position.

Lowering the upper trailer section to the retracted lower transporting position releases the magnetic latch assembly and allows the vertically spaced panels to collapse upon each other in an accordion manner. In like manner, raising the upper trailer section to the extended camping position allows the collapsed panels to extend into a vertical partition with the magnetic latch members automatically engaging.

The collapsible partition is arranged to extend laterally beyond the vertical side wall of the lower trailer section so that the side edge of the partition is in abutting relation with the side wall of the upper trailer section. This construction eliminates any gap between the side edge of the partition and the trailer walls and insures privacy.

BRIEF DESCRIPTION OF THE DRAWINGS

The drawings furnished herewith illustrate the best mode presently contemplated by the inventor and clearly disclose the above advantages and features as well as others which will be readily understood from the detailed description thereof.

In the drawings:

FIG. 1 is a perspective view of a telescopic travel trailer incorporating the invention, with the upper trailer section in the extended position;

FIG. 2 is a plan view of the telescopic travel trailer showing the location of the partition in the rear section;

FIG. 3 is a vertical section taken along line 3—3 of FIG. 2 and showing the partition in the extended position;

FIG. 4 is a vertical section taken along line 4—4 of FIG. 2; and

FIG. 5 is a view similar to FIG. 4 showing the partition in retracted lower position.

FIG. 1 illustrates a telescopic travel trailer 1 including a lower trailer section 2 which is mounted for travel on a pair of wheels 3. An upper trailer section 4 is supported for telescopic vertical movement with respect to the lower trailer section 2. During transportation, the upper trailer section 4 is lowered to a retracted position and can be raised to an extended or upper position for camping.

A plan view of trailer 1 is shown in FIG. 2 with the rear portion broken away to show the interior arrangement of lower trailer section 2. Specifically, lower side walls 5 are mutually connected by lower end wall 6 to form the rear portion of lower trailer section 2. In similar manner, upper side walls 7 are mutually connected by upper end wall 8 to form the rear portion of upper trailer section 4.

Vertical divider wall 9 in lower trailer section 2 separates bath tub 10 from couch 11, all being adjacent to side wall 5. The rear portion of trailer 1 also contains a toilet 12 and a clothes cabinet 13.

FIG. 3 shows upper trailer section 4 in extended upper position with respect to lower trailer section 2. The walls of both the upper and lower trailer sections as well as ceiling 14 are fabricated from a series of horizontal and vertical reinforcing members 15, formed of tubular metal, wood or the like, and an outer skin 16 of metal, plastic or plywood is applied to the outer surfaces of the members 15, while an inner skin or layer 17 formed of plywood or the like is secured to the inner surfaces of the members. Suitable insulation can be located between the spaced vertical and horizontal members 15 in the walls.

A cap 18 formed of plastic or the like is secured to the upper extremity of the side wall 5 of lower trailer section 2 and when the upper trailer section 4 is in the raised or extended position, the inclined edge of portion 19 of cap 18 bears against the resilient seal 20 which is mounted on the inner surface of side wall 7 of upper trailer section 1. Seal 20 is provided with a downwardly extending lip 21 which is secured between the inner skin 17 and the reinforcing members 15 of side wall 7. The incline edge 19 of the cap 18 wedges against the seal 20, compressing the seal and providing an airtight joint between the upper trailer section 4 and the lower trailer section 2.

According to the invention a collapsible or folding divider wall 22 is attached to the upper trailer section and is adapted to separate the bath tub area from the remaining area of the trailer when the upper trailer section is in the extended or camping position. Collapsible wall 22 is attached to upper trailer section 4 by a rigid support or valance 23 which is connected to upper walls 7 and ceiling 14.

Collapsible partition 22 consists of panels 24 and 25 which may be formed of wood, plastic, or other suitable material. Hinges 26 connect panel 24 to support 23 to allow panel 24 to pivot between a vertical extended position to a retracted horizontal position with respect to support 23. Hinges 27 connect panel 25 to panel 24 and allow panel 25 to pivot between a vertical extended position to a retracted horizontal position. With this hinged construction, partition 22 can collapse in an accordion manner from a vertical extended position as shown in FIG. 4 to a retracted lower position as shown in FIG. 5 and vice versa.

The lower edge portion of panel 25 is secured to divider wall 9 of lower trailer section 2 by magnetic latch assemblies 28. The magnetic latch assemblies 28 are best illustrated in FIGS. 4 and 5, and each assembly includes a magnet 29 attached to the lower portion of panel 25 and a plate 30 made of magnetic susceptible material which is attached to a projection 31 of vertical divider wall 9 and oppositely aligned to magnet 29 for mutual magnetic attraction.

When in extended camping position, as shown in FIG. 4, panels 24 and 25 align vertically with support 23 and magnets 29 engage plates 30 to secure partition 22 to vertical divider wall 9 to provide an internal wall within trailer 1. Partition 22 extends beyond lower side wall 5 and lies adjacent to upper side wall 7 as shown in FIG. 3 to provide continuous and complete separation for the bath tub area.

To prepare for transportation, upper trailer section 4 is lowered to a retracted position with respect to lower trailer section 2 which causes partition 22 to collapse, as shown in FIG. 5. Specifically, upper trailer section 4 decends forcing panels 24 and 25 to fold upon each other and disengage the magnetic latch assemblies 28. End 32 of panel 25 forms a pivot point on bath tub 10 near upper projection 31 about which panel 25 pivots into a horizontal position.

To prepare for camping, upper trailer section 4 is raised to an extended position with respect to lower trailer section 2 which automatically allows partition 22 to extend, as shown in FIG. 4. Specifically, panels 24 and 25 are allowed to unfold and permit engagement of magnetic latch assembly 28 through the magnetic attraction between magnets 29 and plates 30.

Magnets 29 and magnetic susceptible plates 30 may be interchangeably placed on vertical divider wall 9 and partition 22 to achieve identical operation.

The present invention thus provides an inexpensive and automatically attachable and detachable partition to provide trailer room separation while not interferring with the telescopic movement of the upper trailer section 4 with respect to lower trailer section 2.

Various modes of carrying out the invention are contemplated as being within the scope of the following claims which particularly point out and distinctly claim the subject matter which is regarded as the invention.

I claim:

1. In a telescopic travel trailer having a lower trailer section and an upper trailer section disposed to telescope vertically with respect to the lower trailer section from a retracted lower position to an extended upper position, comprising
    a collapsible partition located in said upper trailer section,
    releasible connecting means to connect said collapsible partition to said lower trailer section, and
    means responsive to downward movement of said upper trailer section from said upper position toward said lower position for releasing said releasible connecting means and responsive to upward movement of said upper trailer section from said lower position toward said upper position for engaging said releasible connecting means.

2. The apparatus of claim 1, wherein said releasible connecting means comprises a magnet member and a magnetic susceptible member, one of said members attached to said collapsible partition, the other said members attached to said lower trailer section, both of said members aligned for magnetic engagement.

3. In a telescopic travel trailer,
    a lower trailer section,
    an upper trailer section disposed to telescope vertically with respect to the lower trailer section from a retracted lower position to an extended upper position,
    a collapsible partition located in said upper trailer section,
    said lower trailer section including a first vertical exterior wall and said upper trailer section including a second vertical exterior wall located laterally outward of said first vertical exterior wall,
    said partition disposed generally normal to said first and second exterior walls and a side edge of said partition extending laterally beyond said first vertical exterior wall to a location adjacent said second vertical exterior wall, and
    releasible connecting means to releasibly connect said collapsible partition to said lower trailer section.

4. The trailer of claim 3, and including means responsive to downward movement of said upper trailer section from said upper position toward said lower position for releasing said releasible connecting means, said means responsive to upward movement of said upper trailer section from said lower position toward said upper position for engaging said releasible connecting means.

5. The trailer of claim 3, wherein said partition is composed of a series of vertically disposed, pivotally connected, substantially rigid panels.

6. The trailer of claim 3, wherein said releasible connecting means comprises a magnet member and a magnetic susceptible member, one of said members attached to said collapsible partition, the other of said members attached to said lower trailer section, both of said members aligned for magnetic engagement.

7. In a telescopic travel trailer,
    a lower trailer section including a vertical divider wall,
    an upper trailer section disposed to telescope vertically with respect to the lower trailer section from a retracted lower position to an extended upper position and including a valance,
    a collapsible partition composed of a series of vertically disposed, pivotally connected, substantially rigid panels with the uppermost of the panels being hinged to said valance in the upper trailer section, said partition being movable from a substantially vertical extended position when the upper trailer section is in the extended position to a collapsed position when the upper trailer section is in the lower position,
    said lower trailer section including a first vertical exterior wall and said upper trailer section including a second vertical exterior wall located laterally outward of said first vertical exterior wall, said partition disposed generally normal to said first and second exterior walls and a side edge of said partition extending laterally beyond said first vertical exterior wall to a location adjacent said second vertical exterior wall,
    said vertical divider wall including a projection located in the lower trailer section and disposed generally normally to said first and second exterior walls in overlapping engagement with said partition when the partition is in the extended position, and
    a magnetic latch assembly including a magnet member and magnetic susceptible member, one of said members attached to the lower portion of said partition and the other of said members attached to said projection for releasible engagement in the extended position.

* * * * *